United States Patent [19]

Suzuki

[11] Patent Number: 5,694,225
[45] Date of Patent: Dec. 2, 1997

[54] WHITE-LEVEL CORRECTION CIRCUIT USED WITH AN ANALOG-TO-DIGITAL CONVERTER FOR AN IMAGE READING APPARATUS

[75] Inventor: Akio Suzuki, Kawasaki, Japan

[73] Assignee: Fujitsu Limited, Kawasaki, Japan

[21] Appl. No.: 128,673

[22] Filed: Sep. 30, 1993

[30] Foreign Application Priority Data

Feb. 15, 1993 [JP] Japan .................................. 5-024601

[51] Int. Cl.$^6$ .................................................. H04N 1/40
[52] U.S. Cl. .......................... 358/461; 358/406; 358/455
[58] Field of Search .................................. 358/461, 463, 358/455, 504, 405, 406; 382/54

[56] References Cited

U.S. PATENT DOCUMENTS

| | | | |
|---|---|---|---|
| 5,111,311 | 5/1992 | Yamamoto | 358/461 |
| 5,151,796 | 9/1992 | Ito et al. | 358/461 |
| 5,191,445 | 3/1993 | Kurokawa et al. | 358/461 |
| 5,214,520 | 5/1993 | Miyazawa | 358/461 |
| 5,249,068 | 9/1993 | Takase | 358/461 |

*Primary Examiner*—Thomas D. Lee
*Attorney, Agent, or Firm*—Staas & Halsey

[57] ABSTRACT

A white-level correction circuit for an analog-to-digital converter which converts an analog image signal of a pixel, which is input from an external source, to digital image data based on white-level reference voltage and black-level reference voltage inputs. The white-level correction circuit stores white-level reference data for the pixel in a memory and reads the data from the memory in synchronization with the input of the analog image signal. A digital-to-analog converter converts the read white-level reference data to an analog signal comprising the white-level reference voltage. The digital image data is decoded and white-level reference voltage correction data is generated by correcting the read white-level reference data, based on the decoded digital image data, and the white-level correction data is stored in the memory.

15 Claims, 12 Drawing Sheets

WHITE-LEVEL CORRECTION CIRCUIT USED WITH AN ANALOG-TO-DIGITAL CONVERTER FOR AN IMAGE READING APPARATUS

BACKGROUND OF THE INVENTION

1. Field of the Invention

The present invention relates to a white-level correction circuit used for an image input unit which reads an image written on a sheet of paper, etc., and sends the read image data to a host computer, for example.

The image input unit irradiates lamp light onto a sheet of paper on which an image is written and reads the image by converting a light signal, reflected therefrom into an electrical signal (analog image signal), with an image sensor comprising a plurality of charge coupled devices (hereinafter called CCDs). It then converts the analog image signal into a digital image signal with an analog-to-digital converter, to be sent to a host computer. At the conversion, white- and black-level reference voltages are applied to the analog-to-digital converter to provide upper and lower bounds of conversion, respectively.

In general, the black-level reference voltage is defined as a voltage when the CCD outputs none. The white-level reference voltage, in contrast, is influenced largely by the quantity of lamp light irradiated to the sheet, which depends on the distance between the lamp and the sheet, surrounding temperatures, and the time elapsed after the lamp is turned on. It is also influenced by the brightness (or light and shade) of the groundwork (i.e., background) of the sheet from which the light is reflected. Therefore, the white-level reference voltage is required to be corrected for each pixel (or dot) on a line.

Accordingly, along with a remarkable decrease in price of an image processing system, there has been an increased demand for a more and more low-priced and efficient image input unit and therefore, low-priced white-level correction circuit in recent years.

2. Description of the Related Art

FIG. 1 is a block diagram of a white-level correction circuit of the related art.

An image sensor 21 has a plurality of CCDs arranged in a line, corresponding, one for one, to pixels constituting a line of an image.

An amplifier 22 amplifies an image signal read by the image sensor 21 and outputs an analog video signal 1a.

A sample-and-hold circuit 23, comprising amplifiers and a capacitor, samples and holds a signal from a respective CCD, which is masked, out of the incoming analog video signal 1a from image sensor 21, thereby to output a black-level reference voltage 3a.

A random access memory (hereinafter called RAM) 26, which stores a white-level reference data for each pixel of a line, has a memory capacity of 8k words (8 bits/word, k=1024), for example.

Of the 8k words, e.g., 5,000 words correspond, one for one, to 5,000 pixels constituting a line, and 8 bits of a word express the digital white-level reference data in 256 scales.

A digital-to-analog converter (shown as DAC in the Figures) 25 converts the digital white-level reference data 2d read from RAM 26 into an analog voltage (hereinafter called white-level reference voltage) 2a.

An analog-to-digital converter (shown as ADC in the Figures) 24 inputs the white-level reference voltage 2a and black-level reference voltage 3a at input terminals VRT and VRB thereof, to provide upper and lower bounds of conversion, respectively. The analog-to-digital converter 24 inputs the analog video signal 1a at a terminal Vin thereof and converts the signal into 8 bits, for example, of a digital video signal 1d to express the image of a pixel in 256 scales.

Analog comparators (shown as ACPs in the Figures) 57–59 compare the analog video signal 1a (or a voltage V1 into which the signal 1a is divided via resistors ("Res") 5A and 5D) with the white-level reference voltage 2a (or a voltage V2 into which the white-level reference voltage 2a is divided via resistors ("Res") 5B and 5C). Capacitors connected to the analog comparators 57–59, which function as phase correctors, correct a phase shift occurring in high frequency regions to prevent amplifiers (not shown) incorporated in the comparators 57–59 from oscillating.

The comparator 57 compares the voltage V1 with the white-level reference voltage 2a and, when the former is higher than the latter, outputs logical 1 (hereinafter represented by "1"). That is, the comparator 57 outputs "1" when the analog video signal 1a voltage is "considerably" higher than the upper-bound (i.e., upper boundary, or limit) voltage of conversion, in that the voltage V1 to which the analog video signal 1a voltage is dropped is even higher than the upper bound voltage.

The comparator 58 compares the analog video signal 1a voltage with the white-level reference voltage 2a and, when the former is lower than the latter, outputs "1". That is, the comparator 58 outputs "1" when the analog video signal 1a is "lower" than the upper-bound voltage of conversion.

The comparator 59 compares the analog video signal 1a voltage with the voltage V2 and, when the former is lower than the latter, outputs "1". That is, the comparator 59 outputs "1" when the analog video signal 1a is "considerably" lower than the white-level reference voltage 2a, in that the analog video signal 1a is even lower than the voltage v2 to which the upper-bound voltage is dropped.

A read-only memory (hereinafter called ROM) 5E, which is used as a look-up table, stores white-level correction data. It is referred to for a desired white-level correction data when accessed with the read white-level reference data 2d and the comparison result by the analog comparators 57–59 combined as an address. The white-level correction data 1c thus read from the ROM 5E is stored in the RAM 26 through registers 5F and 5G for use as the white-level reference data for the next line pixel which is in the same column as the pixel currently being processed.

When the comparator 57 outputs "1", the analog video signal 1a is recognized as "considerably" larger than the read white-level reference data 2d or the upper bound of conversion. Therefore, a white-level correction data, to which the read white-level reference data 1c requires is required to be increased several scales, is previously stored in the ROM 5E address accessed.

When the comparator 58 outputs "1", the analog video signal 1a is recognized as being "a little" bit smaller than the read white-level reference data. Therefore, a white-level correction data, to which the read white-level reference data 2d requires to be increased one scale, is previously stored in the ROM 5E address accessed.

When the analog comparator 59 outputs "1", the analog video signal 1a is recognized as "considerably" smaller than the read white-level reference data 2d. Therefore, a white-level correction data with the same value as that of the read white-level reference data is previously stored in the ROM 5E address accessed.

The correction data thus read from the ROM 5E is stored into the RAM 26 address corresponding to the current pixel position in the line, i.e., where the read white-level reference data 2d was stored. Then, later when the next line is scanned, the white-level correction data thus stored in the RAM 26 is read for use as the white-level reference data for the pixel in the same column as the current one.

Thus, every time an analog video signal 1a for a pixel is input from the image sensor 21 to be converted to a digital video signal 1d, the above-mentioned comparison and correction operations are performed in preparation for the pixel on the same column of the next line.

In summary, the conventional white-level correction circuit compares the analog video signal 1a voltage with the white-level reference voltage 2a by using the analog comparators 57–59, reads the white-level correction data from the ROM 5E based on the comparison result, and stores the read white-level correction data back in the RAM 26.

A problem is that the analog comparators, which compare signals in with regard to analog voltage levels, are expensive in themselves. Moreover, in order to increase an operation speed for achieving a higher image processing speed, the comparators need, as is well known, to have phase-shift correcting capacitors incorporated therein for preventing an oscillation caused in high frequency regions, which eventually increases the circuit cost all the more.

Another problem is that the conventional white-level correction circuit tends to be unstable in operation, since it is difficult to realize a stable and high-speed signal processing circuit because of frequency characteristics of electronic parts and printed-circuit boards, especially in high frequency regions.

SUMMARY OF THE INVENTION

It is an object of the present invention to provide an economical white-level correction circuit by reducing the number of electronic parts.

It is another object of the present invention to provide a stable and high-speed white-level correction circuit which can increase an image processing speed.

To achieve the above and other objects, the present invention provides storage means, digital-to-analog conversion means, decoding means and correction means.

In a white-level correction circuit used for an analog-to-digital converter for converting an incoming analog image signal of a pixel to digital image data, based on a white-level reference voltage input thereto, the storage means stores white-level reference data for the pixel and reads the data therein in synchronization with the analog image signal input. The digital-to-analog conversion means converts the read white-level reference data to an analog signal to be supplied to the analog-to-digital converter as the white-level reference voltage. The decoding means decodes the digital image data. The correction means generates white-level correction data by correcting the read white-level reference data based on the decoding by the decoding means and stores the white-level correction data into the storage means.

BRIEF DESCRIPTION OF THE DRAWINGS

Throughout the above-mentioned drawings, identical reference numerals are used to designate the same or similar component parts.

DESCRIPTION OF THE PREFERRED EMBODIMENTS

Figure 1:
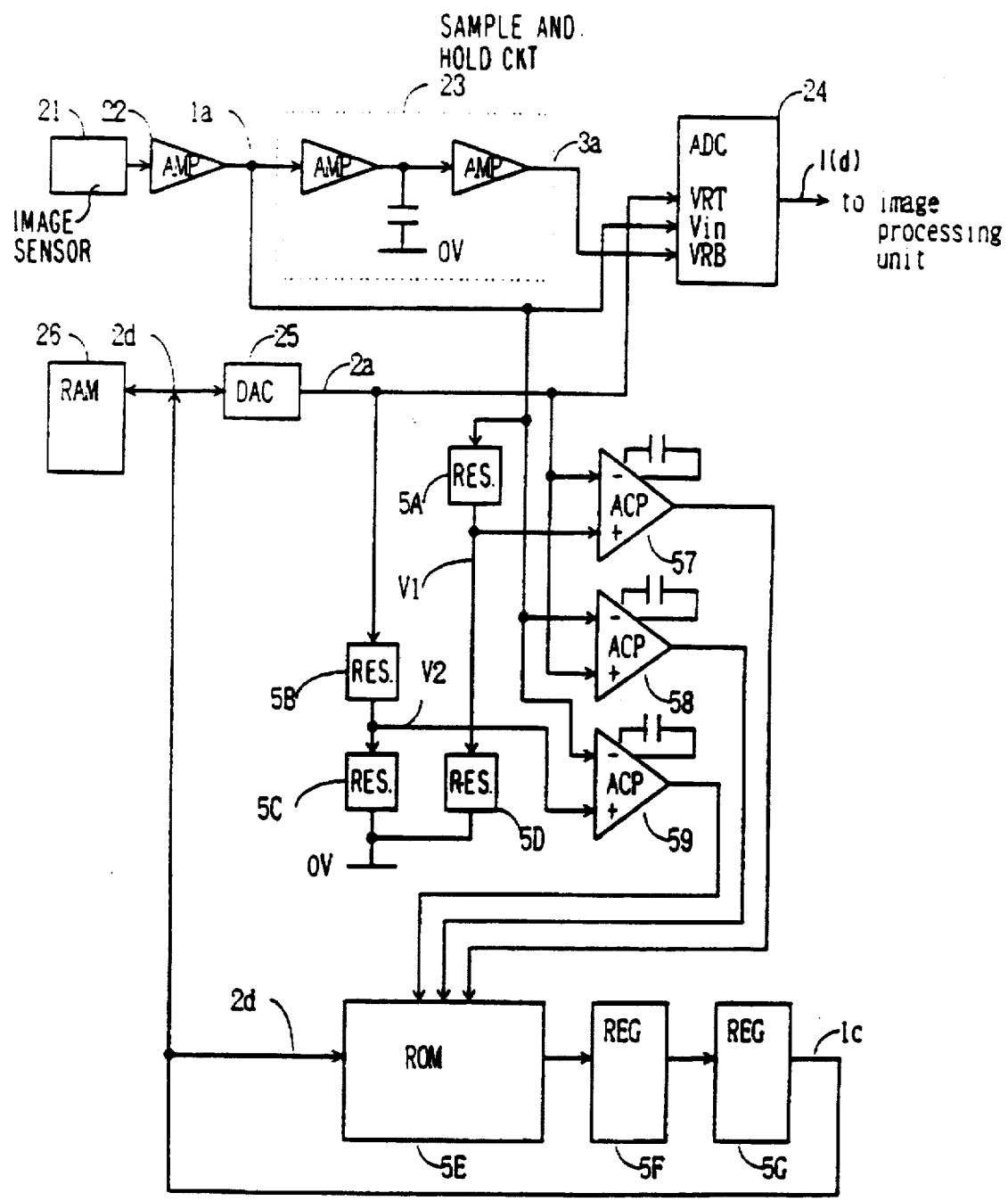
FIG. 1 is a block diagram of a white-level correction circuit of the related art.
Figure 2:
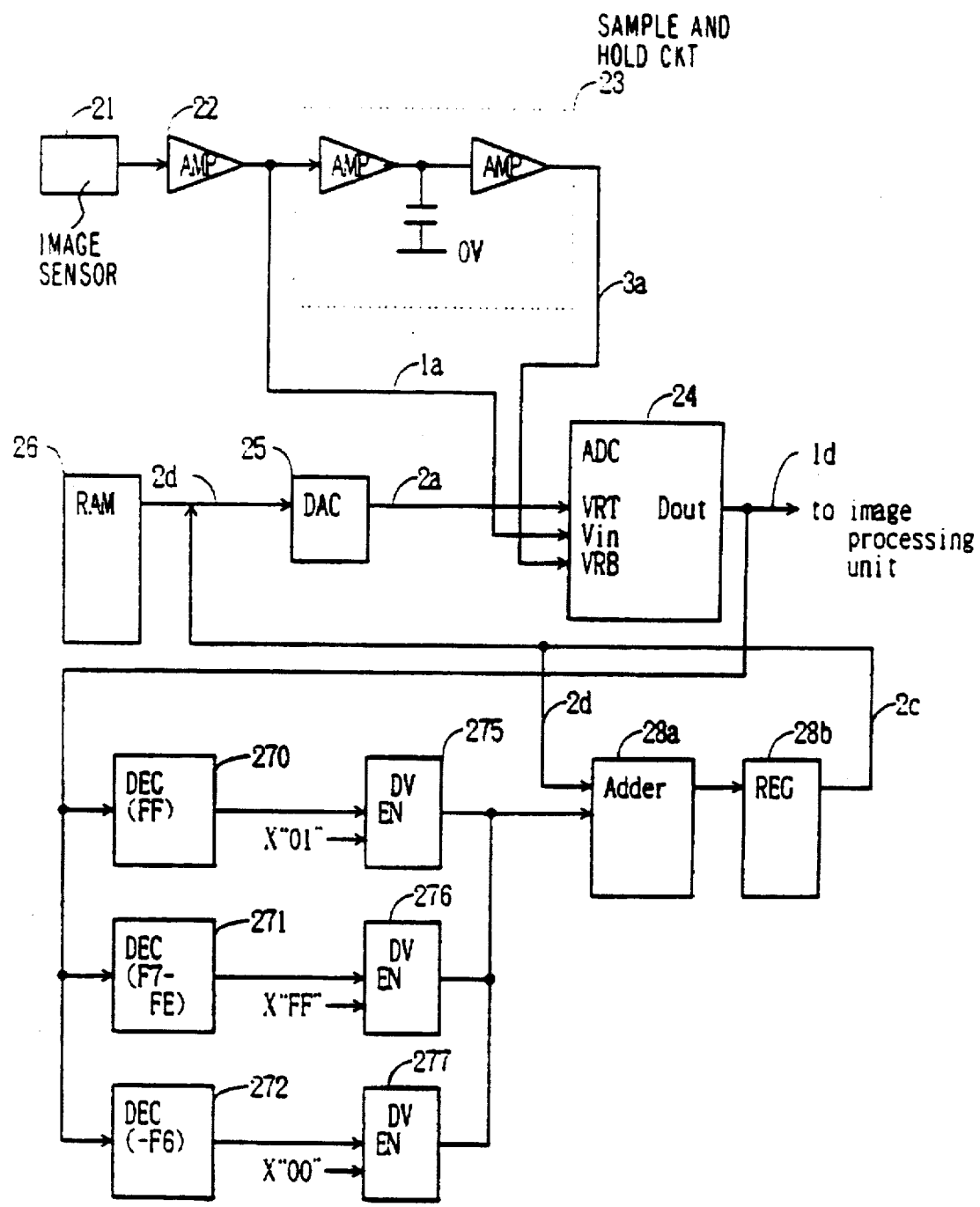
FIG. 2 is a block diagram of a white-level correction circuit of a first embodiment of the present invention.

FIG. 2 is a block diagram of a white-level correction circuit of the first embodiment of the present invention.

An image sensor 21 comprises a plurality of charge coupled devices (hereinafter called CCDs) arranged in a line, corresponding to a plurality of pixels (or dots) which constitute a line of an image. The CCDs are driven, one by one, from the left to the right, for example, to read a line of the image and to output a series, or sequence, of image signals (hereinafter this operation is referred to as scanning a line).

An amplifier 22 amplifies the image signal input from the image sensor 21 and outputs an amplified analog video signal 1a. The analog video signal 1a is input to a terminal Vin of an analog-to-digital converter (shown as ADC in the Figures) 24 and converted thereby into a digital signal (hereinafter called a digital image signal 1d).

A sample-and-hold circuit (SH CKT) 23, which comprises amplifiers and a capacitor, samples and holds a video signal from a CCD whose photosensitive cell is masked, out of the incoming analog video signal 1a, to output a black-level reference voltage 3a.

Since the black-level reference voltage is, generally, defined as a voltage when a CCD outputs none, at least one CCD whose photoconductive cell is masked is provided among the CCDs. Of the analog video signals 1a, the signal from the CCD whose photosensitive cell is masked is input to and held in a sample-and-hold circuit 23, the output of which is then output, to the terminal VRB of the analog-to-digital converter 24, as a black-level reference voltage 3a thereby to provide the lower-bound of conversion.

On the other hand, the white-level reference data, which was corrected and stored in the RAM 26 during processing of the former line, is read out from the RAM 26 for processing of the current pixel, input to a digital-to-analog converter 25 and converted into an analog voltage signal (hereinafter called a white-level reference voltage 2a). The white-level reference voltage 2a is input to terminal VRT of the analog-to-digital converter 24 to provide an upper bound of conversion, The difference between the upper- and lower-bound voltage is divided into 256 scales, for example, and each of which scales is expressed in 8 bits. Thus, the analog video signal 1a input to the terminal Vin of the analog-to-digital converter 24 is converted into 8-bit digital video signal 1d, to express the image in 256 scales.

The digital video signal 1d from the analog-to-digital converter 24 is input to decoders (shown as DEC in the Figures) 270–272, which determine the value of the signal video signal 1d. (Hereinafter, numbers 0–9, 10, 11, 12, 13, 14, 15 are represented, in hexadecimal notation, as 0–9, A, B, C, D, E, F, in that order, and a hexadecimal number n is represented as X"n". Thus, the 8-bit digital video signal 1d is represented by 2-digit hexadecimal numbers X"00" to X"FF".)

Figure 5:
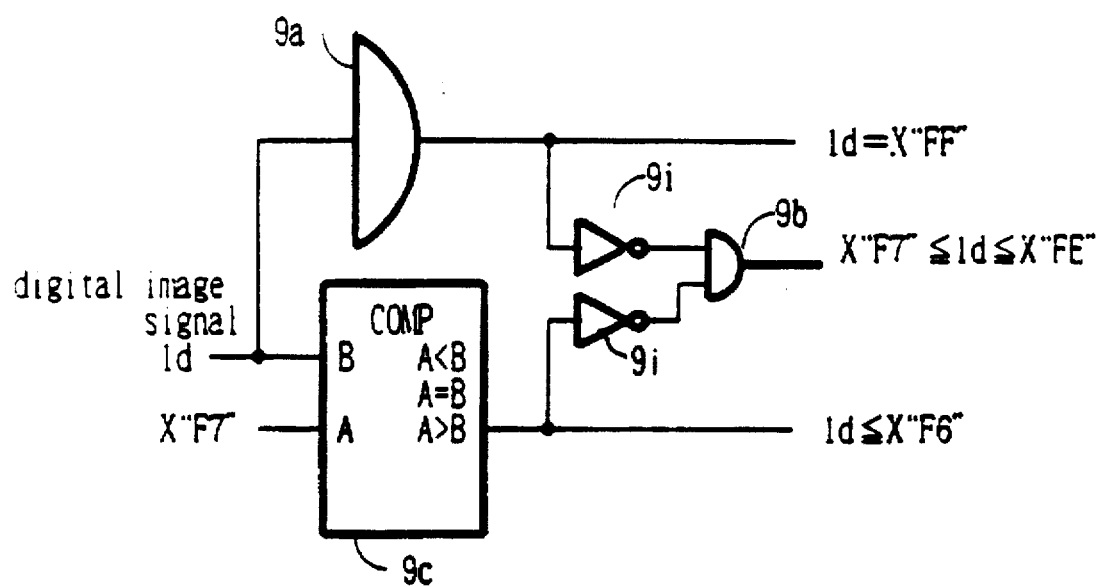
FIG. 5 shows a circuit example of the decoders 270–272.

FIG. 5 shows a circuit example of the decoders 270–272.

An 8-input AND gate 9a, which represents the decoder 270, outputs "1" when the 8 bits of the digital video signal 1d are all "1"s, i.e., X"FF". A comparator 9c (or an arithmetic and logical unit ALU), which represents the decoder 272, outputs "1" when the digital video signal 1d is smaller than X"F7", i.e., X"F6" or less (hereinafter represented as X"-F6"). Two inverters 9i and one 2-input AND gate 9b, which represent the decoder 271, output "1" when the digital video signal 1d is neither X"FF" nor larger than X"F7", i.e., any value of X"F7" to X"FE" inclusive (hereinafter represented as X"F7–FE").

Accordingly, the decoder 270 outputs "1" when detecting that the value of digital video signal 1d is "FF", which represents very bright white of the 256 scales. The decoder 271 outputs "1" when detecting that the value of the digital video signal 1d is either of X"F7–FE", which represents a little dark white of the 256 scales. The decoder 272 outputs "1" when detecting that the value of the digital video signal 1d is X"-F6", which represents considerably dark white of the 256 scales.

When the decoder 270 outputs "1" after detecting that the value of digital video signal 1d is X"FF", the voltage level of the analog video signal 1a for the pixel concerned is recognized as being equal to or larger than the white-level reference voltage 2a (or upper-bound voltage) and, therefore, the read white-level reference data 2d is required to be increased (or raised). When the decoder 270 outputs "1", an EN terminal of the driver circuit (shown as DV in the Figures) 275 is activated to enable a constant X"01" to be gated out to an adder 28a. Thus, X"01" is added to the read white-level reference data 2d to prepare the white-level correction data for the pixel of the next line.

When the decoder 271 outputs "1" after detecting that the value of digital video signal 1d is X"F7–FE", the voltage level of the analog video signal 1a for the pixel concerned is recognized as a little bit smaller than the white-level reference voltage 2a (or upper-bound voltage) and, therefore, the read white-level reference data 2d is required to be decreased (or lowered). When the decoder 271 outputs "1", an EN terminal of the driver circuit 276 is activated to enable a constant X"FF" to be gated out to the adder 28a. Adding X"FF", which is 2's complement of X"01", to the read white-level reference data 2d, subtracts X"01" from the read white-level reference data 2d. Thus, X"01" is subtracted from the read white-level reference data 2d to prepare the white-level correction data for the pixel of the next line.

When the decoder 272 outputs "1" after detecting that the value of the digital video signal 1d is X"-F6", the voltage of the analog video signal 1a for the pixel concerned is recognized as considerably smaller than the white-level reference voltage 2a. That is, the pixel per se is a tone between gray and black in this case, and the digital video signal 1d is considered no longer as a variation in white level. Therefore, the read white-level reference data 2d need not be corrected. When the decoder 272 outputs "1", an EN terminal of the driver circuit 277 is activated to enable a constant X"00" to be gated out to an adder 28. Thus, X"00" is added to the read white-level reference data 2d to leave the white-level reference data unchanged for the pixel of the next line.

Of the decoders 270–272, any one which outputs "1" enables only one of the respective driver circuits 275–277 to gate X"01", X"FF" or X"00", respectively, out to the adder 28a. Other driver circuits are disabled and provide a high-impedance state of the tri-state logic.

The adder 28a adds an addend (X"01", X"FF" or X"00"), which is gated out from the driver circuits 275–277, to the read white-level reference data 2d, thus correcting the read white-level reference data 2d. The addition result is set in the register 28b and stored in the RAM 26 address corresponding to the pixel, as the white-level correction data 2c. Then, when the next line is scanned and the pixel in the same column is processed, the data stored is read out from the RAM 26 as the white-level reference data 2d.

Figure 6:
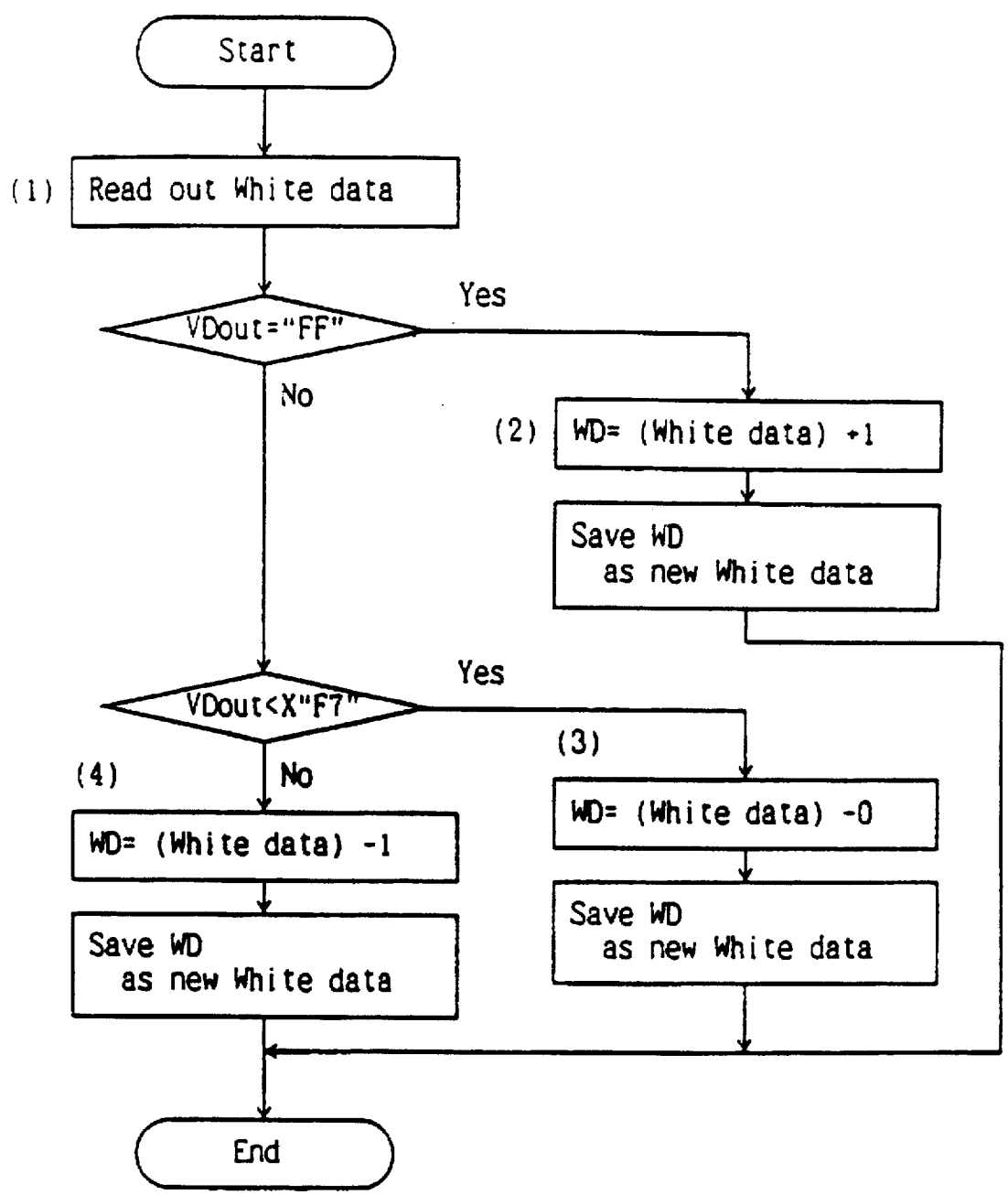
FIG. 6 is a flowchart illustrating a first embodiment of the present invention.

In summary, the white-level correction circuit of the first embodiment operates as shown in FIG. 6.

FIG. 6 is a flowchart illustrating the first embodiment of the present invention.

(1) In synchronization with the scanning of a line, an analog video signal 1a for a pixel is input and the white-level reference data (abbreviated to white data in the Figure) for the pixel is read from the RAM 26. The analog video signal 1a is converted into a digital video signal 1d by the analog-to-digital converter 24.

(2) When the digital video signal 1d (shown as VDout in the Figure) is "FF", 1 is added to the read white data and the addition result WD is stored into the RAM 26 as new white data (or the white-level correction data).

(3) When VDout is smaller than "F7" (i.e., "-F6"), 0 is added to the read white data and the addition result WD is stored into the RAM 26(4) When VDout is not smaller than "F7" (i.e., any of "FE" to "F7" inclusive, 1 is subtracted from the read white data and the subtraction result WD is stored into the RAM 26 as new white data (or the white-level correction data). The portion including the driver circuits 275–277 and adder 28a may be replaced, or substituted, by a RAM. In that case and depending on the VDout value "FF", "-F6" or "F7–FE", plus 1, 0 or minus 1, respectively added to the white data, is stored therein.

The operation to read pixels in a line and to output a series of analog video signals 1a is synchronized with the operation to read the white-level reference data from the RAM 26 for the pixels, by means of scanning pulses which drives the CCDs sequentially to scan a line.

A white-level correction circuit of the second embodiment of the present invention is described below on reference to FIGS. 3 (a) and 3 (b).

Figure 3A:
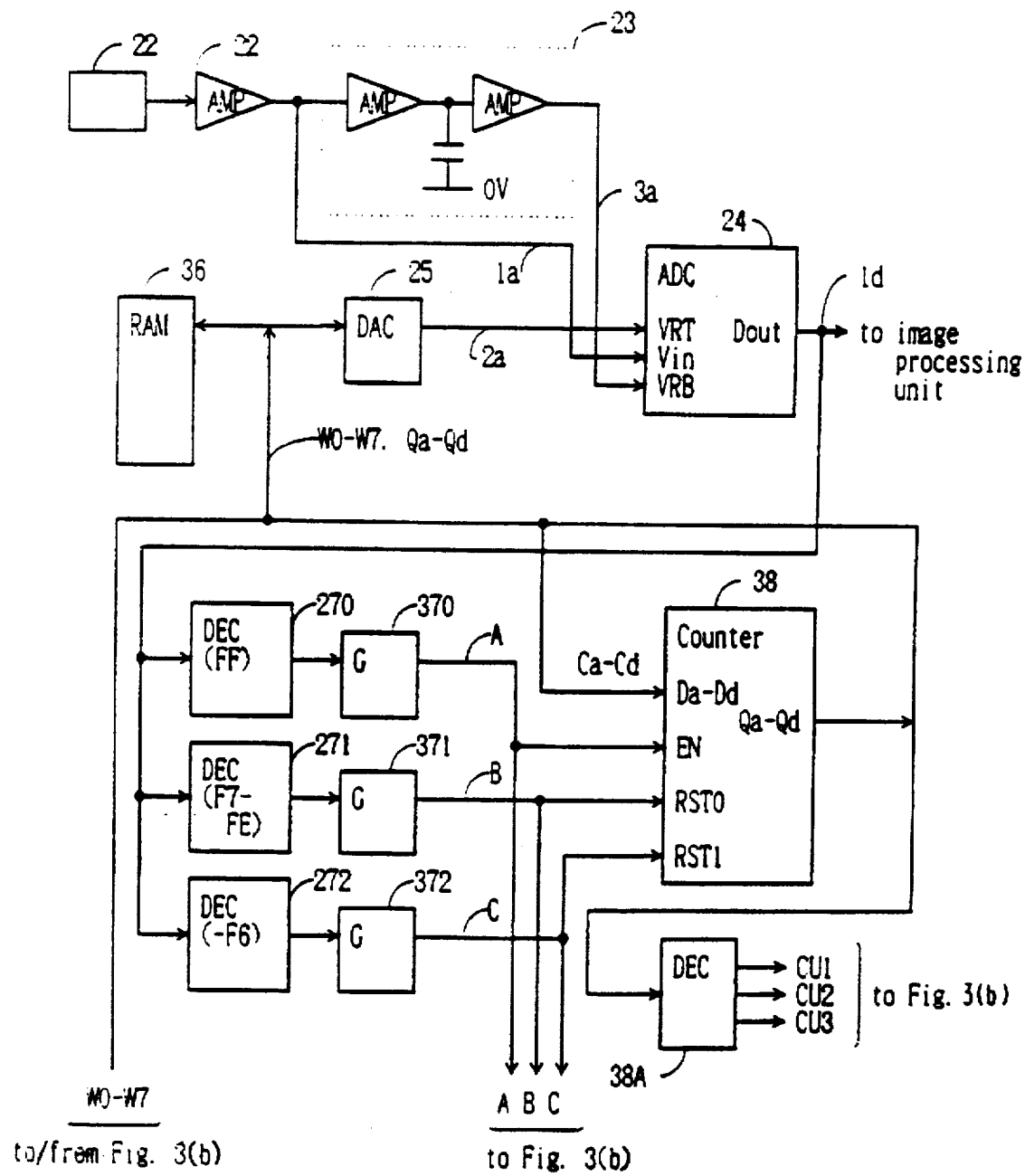
FIGS. 3 (a) and 3 (b) are block diagrams of a white-level correction circuit of the second embodiment of a present invention.
Figure 3B:
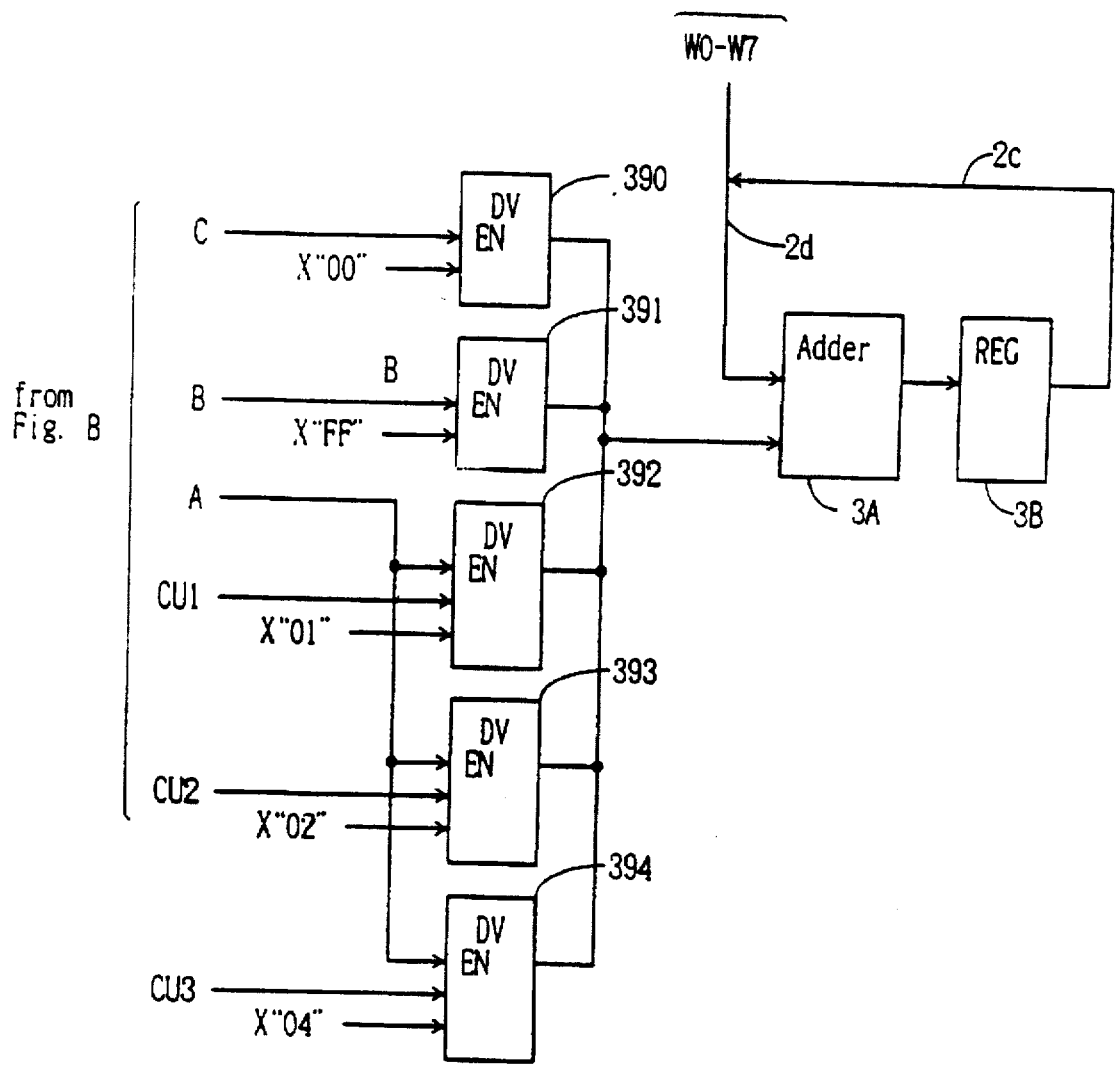

FIGS. 3 (a) and 3 (b) are block diagrams of a white-level correction circuit of the second embodiment of the present invention.

In this embodiment, too, the decoders 270–272 and analog-to-digital converter 24 operate in the same way as in the first embodiment explained with FIG. 2.

The outputs of the decoders 270–272 are input to gate circuits 370–372 which function just as buffers, whose outputs (A, B and C) are then input to a counter 38 and to driver circuits 390–394 (see FIG. 3 (b)).

A random access memory (shown in the Figures as RAM) 36 stores 4-bit count data (Ca–Cd) besides the 8-bit white-level reference data (W0–W7), corresponding to each pixel of a line. The count data (Qa–Qd) is read from the RAM 36 along with the white-level reference data 2d and set in the counter 38 through terminals Da–Dd.

When an output (Dout) of the analog-to-digital converter ("ADC") 24 indicates X"FF", the decoder 270 outputs "1" to a count enable terminal of the counter 38 via the gate circuit 370 and enables the counter 38 to increase the count (Qa–Qd).

When the analog-to-digital converter 24 does not output X"FF", either of the decoders 271 and 272 outputs "1" to a reset terminal RST0 or RST1 to clear the count (Qa–Qd) of the counter 38.

The counter 38 is controlled as follows:

The count data (Ca–Cd), which was stored in the RAM 36 with the count increased or cleared by the counter 38 during processing of the pixel of the former line, is read out from the RAM address corresponding to the pixel of the current line in synchronization with the scanning of the CCDs, and set in the counter 38 through the terminal Da–Dd.

Then, the count of the counter 38 is increased or cleared in dependence upon whether the output (Dout) of the analog-to-digital converter 24 is X"FF" or not. Thus, the count data (Ca–Cd) counts the number of X"FF"s that have appeared in pixel positions in the same column (i.e., in the direction perpendicular to the lines).

The decoder 38A decodes the output (Qa–Qd) of the counter 38 and outputs CU1, CU2, and CU3 signals showing that the decoding results are, e.g., X"1", X"2" and X"3", respectively. The CU1 signal's being active means that the value of the digital video signal 1d for the pixel of the current line is X"FF" and that of the former line was not X"FF". The CU2 signal's being active means that the value of the digital video signal 1d for the pixel of the current line is X"FF" and that of the former line was X"FF", but that of two lines ahead was not X"FF". The CU3 signal's being active means that the value of the digital video signal 1d for the pixel of the current line is X"FF" and those of the former two consecutive lines were also X"FF".

In FIG. 3 (b), based on the decoder-38A output and signals A, B and C, one of the driver circuits (shown as DV in the Figure) 390–394 is enabled to select an addend (e.g., X"00", X"FF", X"01", X"02" or X"04) to be added to the read white-level reference data 2d (W0–W7) read from the RAM 36.

When the digital video signal 1d output from the analog-to-digital converter 24 indicates X"FF" (i.e., the signal A is active) and when the count (Qa–Qd) of the counter 38 is X"1" (i.e., the decoder 38A activates CU1), the driver circuit 392 is enabled to output an addend X"01" to the adder 3A. That is, the value X"01" is added to the read white-level reference data 2d to produce the white-level correction data 2c for the pixel of the next line.

When the digital video signal 1d indicates X"FF" (i.e., the signal A is active) and when the count (Qa–Qd) is X"2" (i.e., the decoder 38A activates CU2), the driver circuit 393 is enabled to output an addend X"02" to the adder 3A. That is, the value X"02" is added to the read white-level reference data 2d to produce the white-level correction data 2c for the pixel of the next line.

In the same way, when the digital video signal 1d indicates "FF" (i.e., the signal A is active) and when the count (Qa–Qd) is X"3" or more (i.e., the decoder 38A activates CU3), the driver 394 is enabled to output an addend X"04" to the adder 3A. That is, the value X"04" is added to the read white-level reference data 2d to produce a white-level correction data 2c for the pixel of the next line.

When the digital video signal 1d indicates X"F7-FE" or X"-F6" (i.e., the signal B or C is active), the driver 391 or 390 is enabled to perform white-level correction in the same way as in the first embodiment explained with FIG. 2.

As described above, when the digital video signal 1d indicates consecutive X"FF"s for a certain pixel column, it is recognized that a considerable change has occurred in the white level along the pixel column and the white-level correction is conducted according to the magnitude of the count data so that the white-level reference data 2d follows the change of white level quickly.

Figure 7:
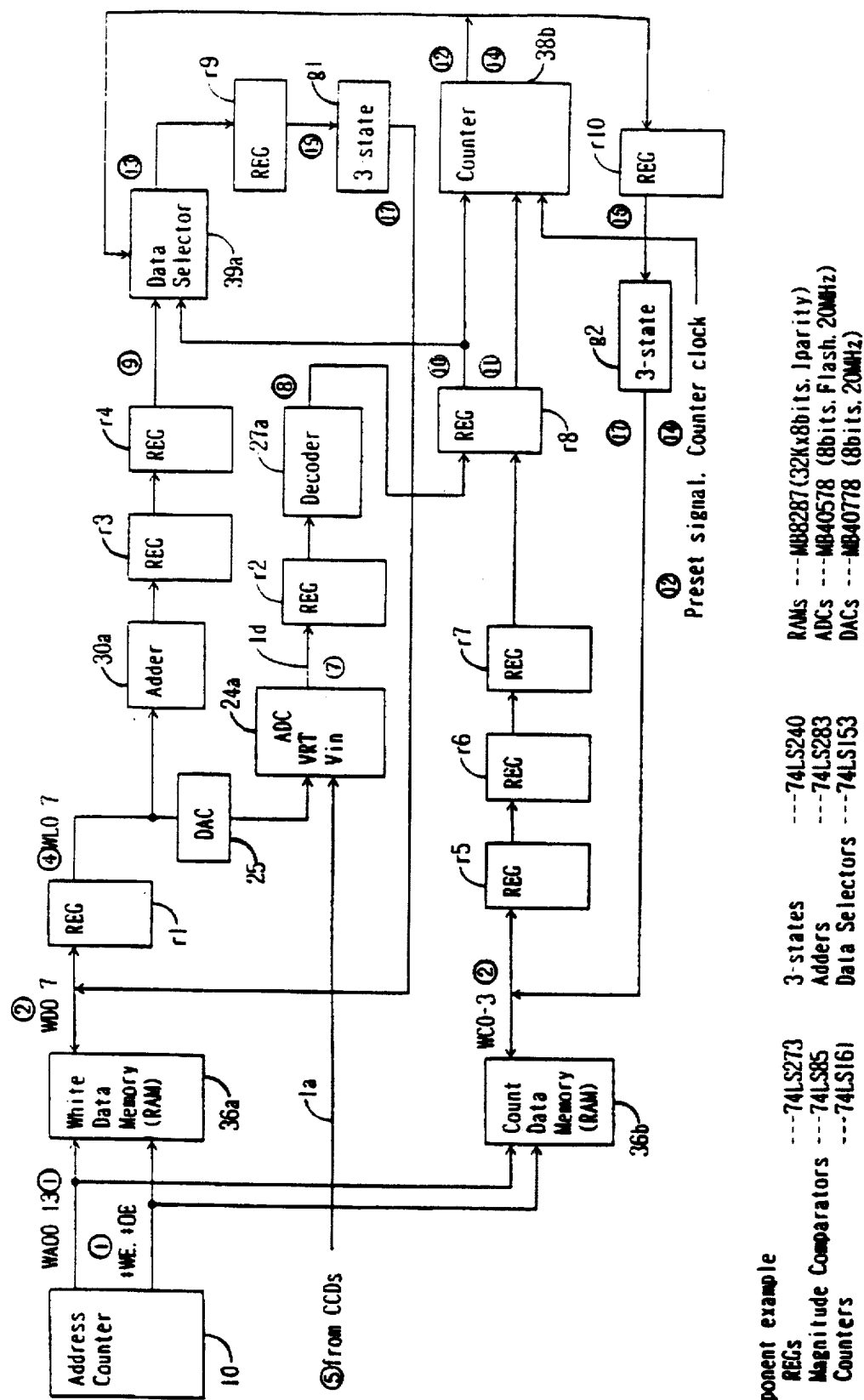
FIG. 7 is a detailed circuit diagram of the white-level correction circuit of the second embodiment.
Figure 8A:
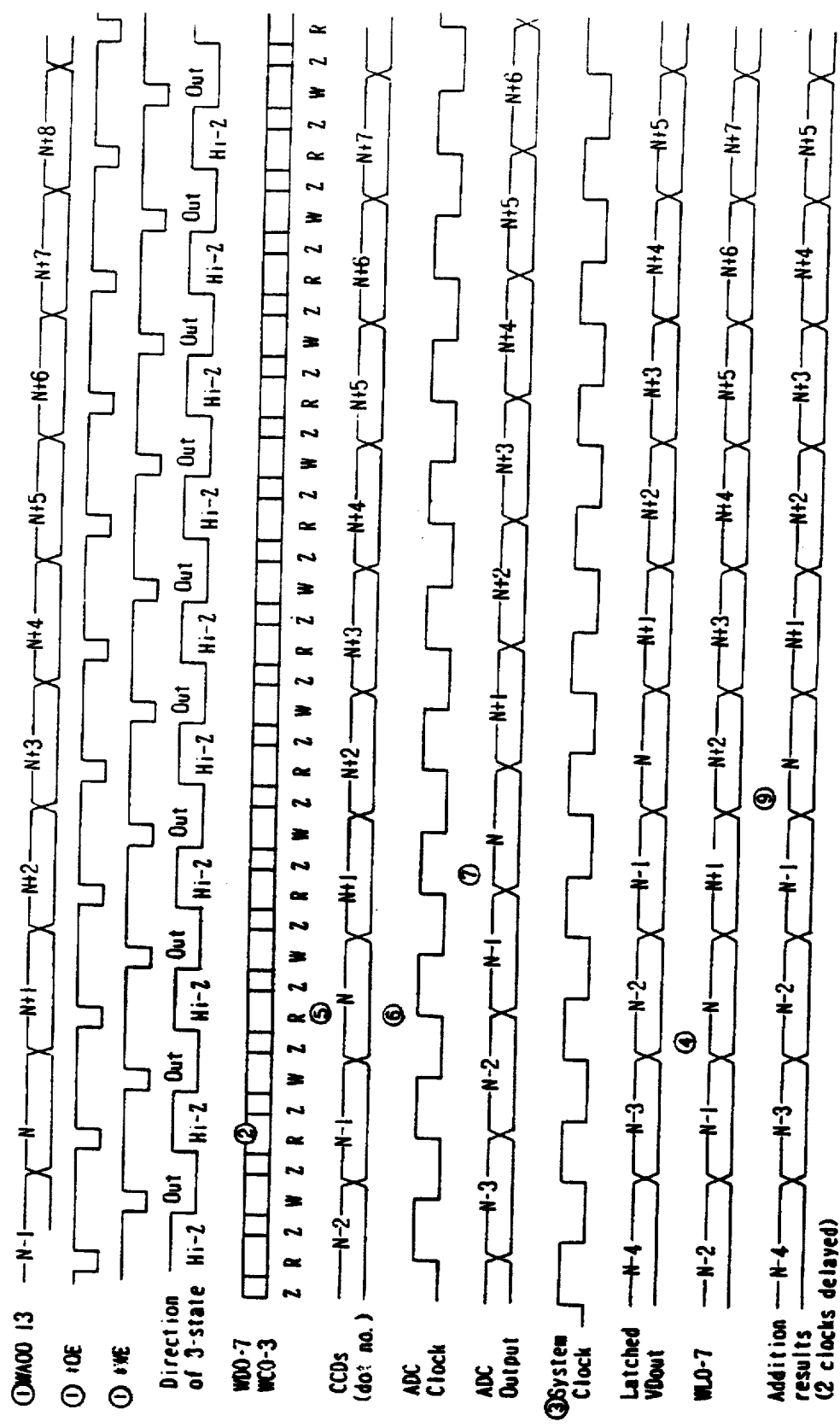
FIGS. 8 (a) and 8 (b) show a timing chart illustrating operations of the circuit diagram in FIG. 7.
Figure 8B:
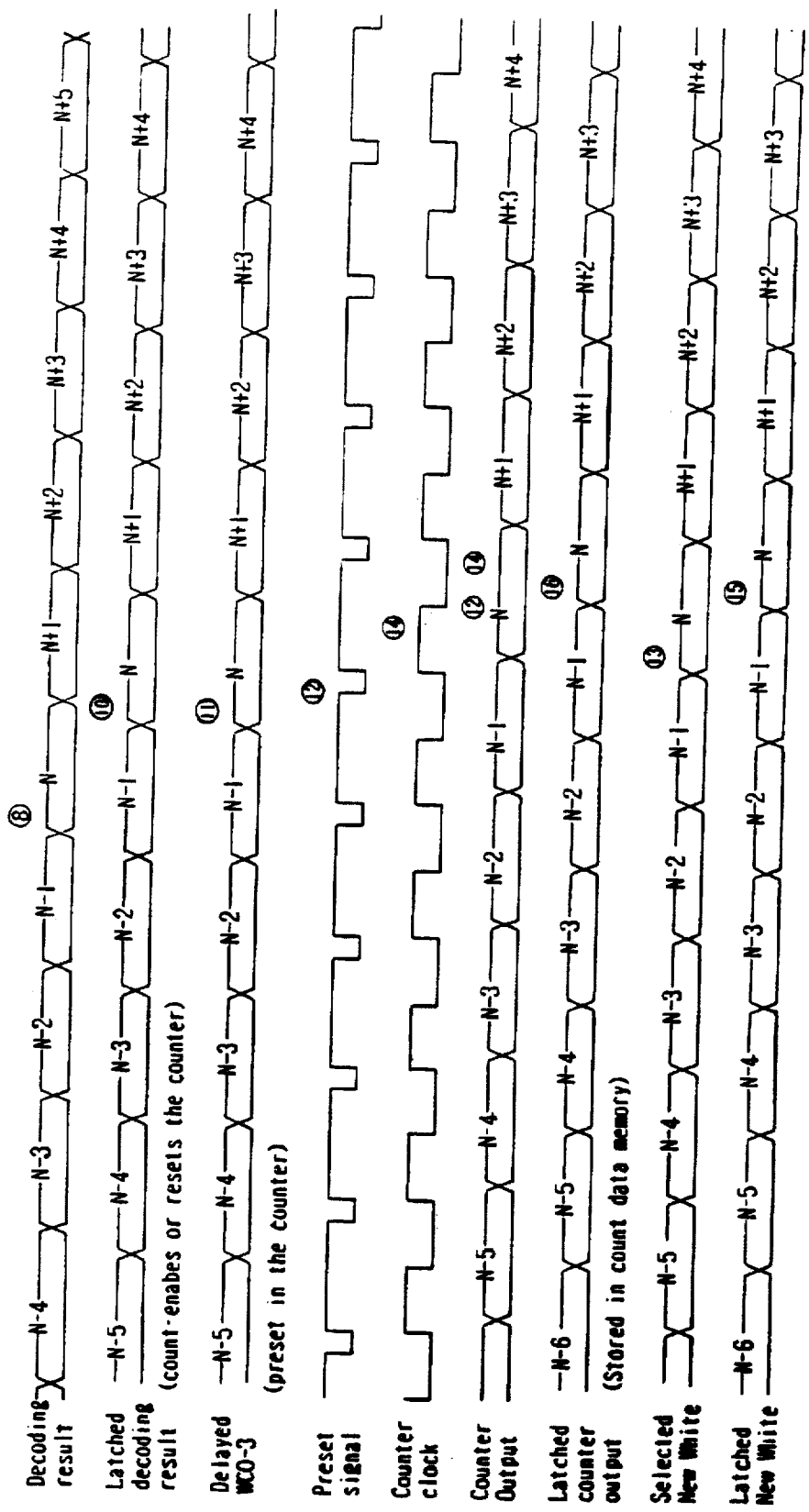

FIG. 7 is a detailed circuit diagram of the white-level correction circuit of the second embodiment. FIGS. 8 (a) and 8 (b) show a timing chart illustrating the circuit diagram in FIG. 7.

A detailed operation of the circuit diagram in FIG. 7 is described below on reference to the timing chart in FIGS. 8 (a) and 8 (b).

① An address counter 10 up-counts periodically and outputs count data WA00–13 to a white data memory 36a and count data memory 36b as an address corresponding to the pixels. The address counter also outputs read and write timing signals *OE and ,WE (* represents a negation here). Both memories have a memory capacity of 8k words (k=1024), each word corresponding to a pixel of about 5,000 pixels in a line.

② When the WA00–13 indicates a pixel N, for example, the white data WD0–7 and count data WC0–3 for the pixel N are read out at the timing *OE.

③ A system clock (shown only in the timing chart) occurs to synchronize operations of the circuit, esp. registers (hereinafter abbreviated to REGs in the Figure).

④ The read white data WD0–7 (or white-level reference data) is set in a register r1 at a leading edge of the system clock and is output therefrom as WL0–7. The WL0–7 is input to the adder 30a. It is also input to the ADC 24a and converted into a voltage signal to provide the upper bound of conversion for the DAC 25 .

⑤ The CCDs, which are scanned one system clock period behind the addressing of the white data memory 36a and count data memory 36b, output the analog image signal 1a for the pixel N.

⑥ An ADC clock (shown only in the timing chart) occurs so as to have the ADC 24a sample the analog image signal 1a at a leading edge thereof and to convert the signal into a digital signal.

⑦ The ADC 24a outputs the digital image signal 1d (or VDout) at the next leading edge of the ADC clock.

⑧ The digital image signal 1d is input to the decoder 27a (decoder 270–272 in FIG. 3 (a)) via a register r2 and is decoded thereby to provide a decoded result X"FF", X"F7-FE" or X"-F6".

⑨ Predetermined values X"0", X"1", X"2", X"4" and X"FF" are each added to the WL0–7 (register-r1 output) and the addition results are input to a data selector 39a via registers r3 and r4.

⑩ The decoding result (X"FF", X"F7-FE" or X"-F6") decoded by the decoder 27a is latched in a register r8. The latched decoding result is then latched in the counter 38b.

⑪ The count data WC0–3 read from the count data memory 36b is delayed by three system-clock periods via registers r5–r7 and latched in the register r8.

⑫ The WC0–3 latched in the register r8 (delayed by WC0–3) is latched in the counter 38b by a preset signal.

⑬ One of the addition results (⑨) is selected by the data selector 39a based upon the latched decoding result (⑩) and the counter-38b output (⑫).

⑭ The count of the the counter 38b is increased by one or cleared by a counter clock, depending upon the latched decoding result (⑩) being X"FF" or not.

⑮ The selected data (⑬) by the data selector 39a is latched in a register r9.

⑯ The counter output (⑭) is latched in a register r10.

⑰ The register-r9 output (new white data or white-level correction data) and register-r10 output (updated count data) are stored, at the timing *WE, into the white data memory 36a and count data memory 36b, respectively, via respective 3-state gates g1 and g2.

A white-level correction circuit of the third embodiment of the present invention is described below on reference to FIG. 4.

Figure 4:
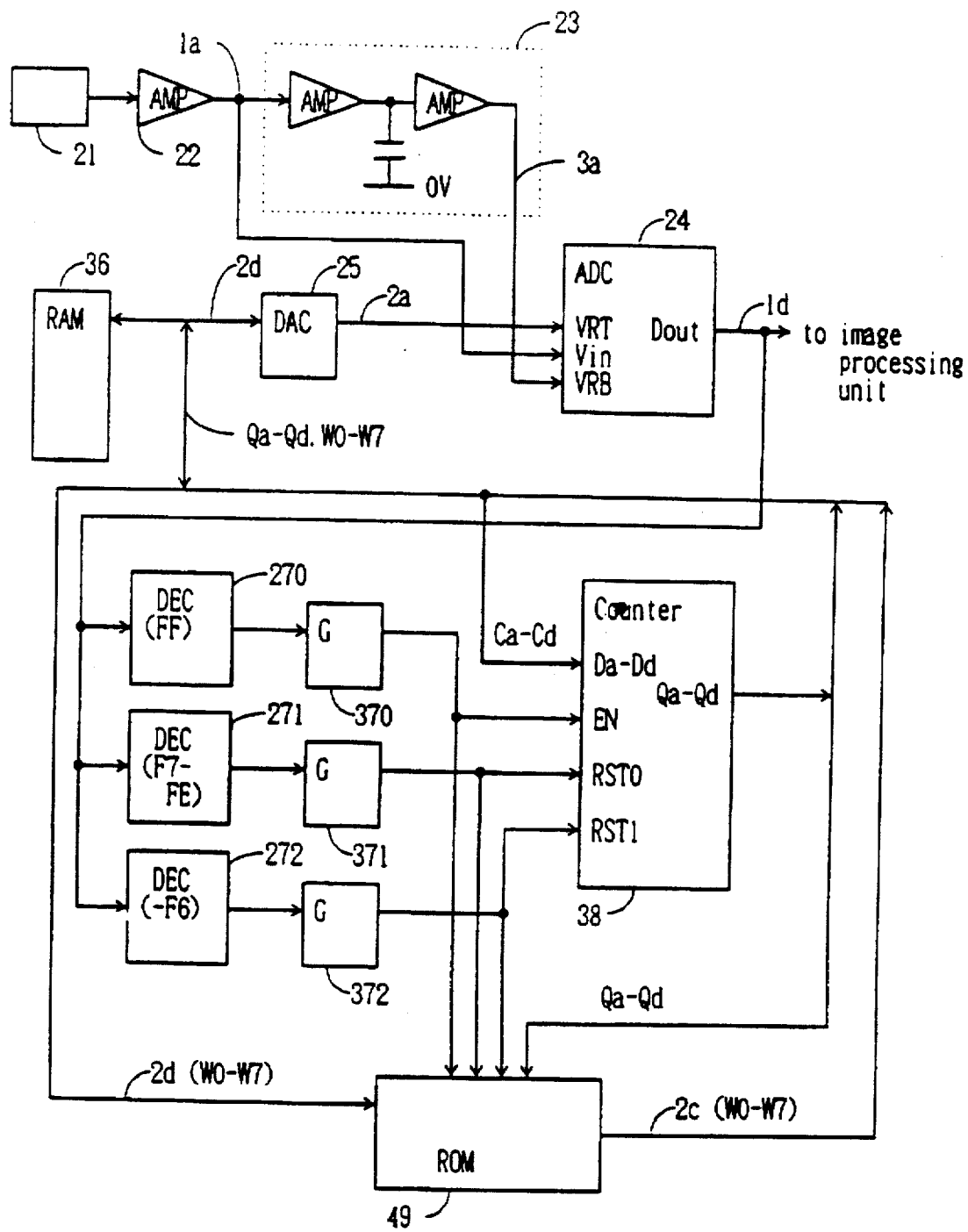
FIG. 4 is a block diagram of a white-level correction circuit of a third embodiment of the present invention.

FIG. 4 is a block diagram of a white-level correction circuit of the third embodiment of the present invention therein, a ROM 49 is substituted for the portion, including the driver circuits 390-394 and the adder 3A, in FIGS. 3 (a) and 3 (b).

In this embodiment, white-level correction data 2c are previously stored in the ROM 49. Desired white-level correction data 2c is addressed by accessing the ROM 49 with 8 bits (W0-W7) of the read white-level reference data 2d, 4 bits (Qa-Qd) of the counter 38 and 3 bits (A, B and C) from the gate circuits 372-372, combined as an address.

The white-level correction data 2c read from the ROM 49 is stored in the RAM 36 address corresponding to the current pixel position, along with the cleared or increased count (Qa-Qd) of the counter 38. When the next line is scanned, the white-level correction data and count (Qa-Qd) thus stored is read out from the RAM 36 as the white-level reference data (W0-W7) and count (Ca-Cd) for processing the pixel in the same column.

In FIGS. 3 (a)-4, the count data is used only in increasing the white-level reference data. However, the white-level correction can be controlled more elaborately by using the count data in decreasing and in leaving unchanged operations, in addition to increasing the white-level reference data, as shown in FIGS. 9 (a) and 9 (b).

Figure 9A:
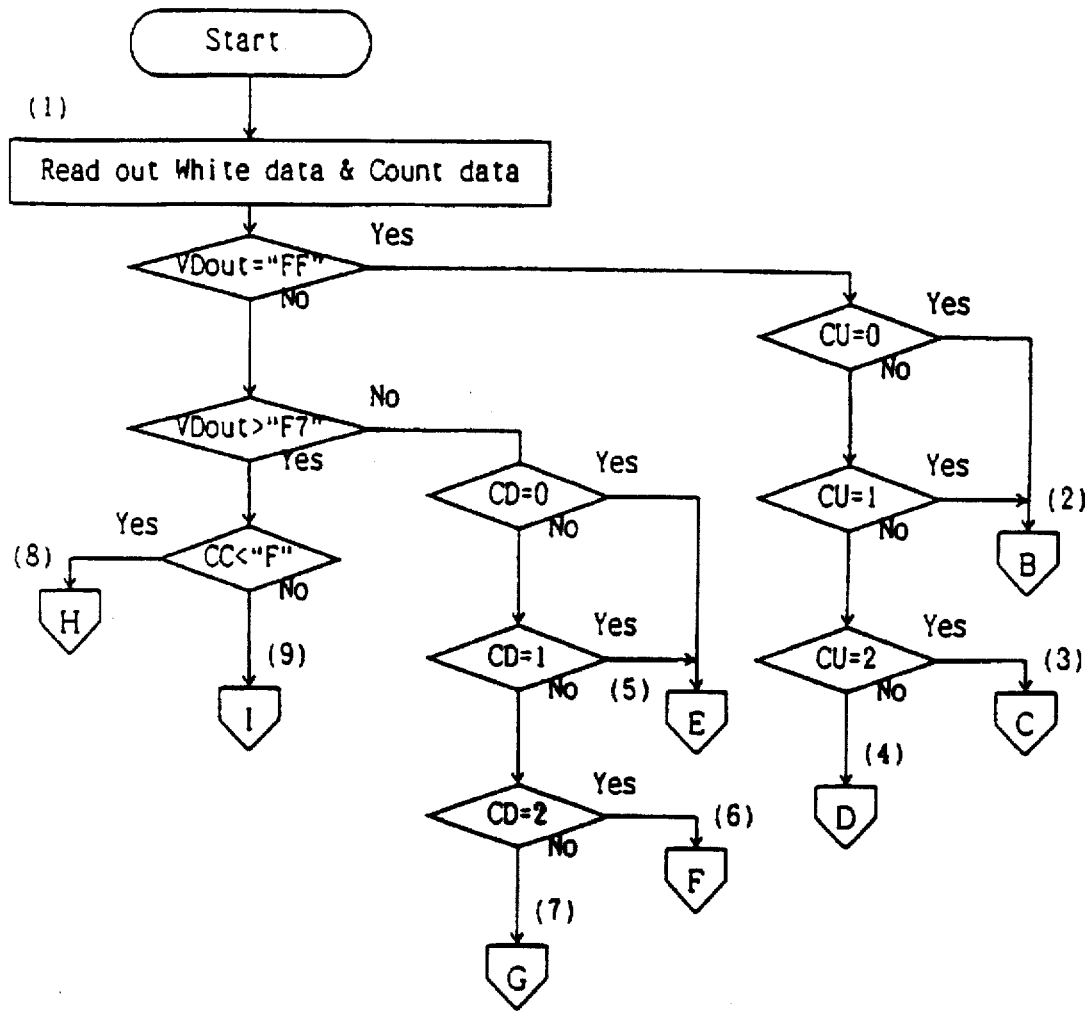
FIGS. 9 (a) and 9 (b) are flowcharts illustrating a variation of the second embodiment.
Figure 9B:
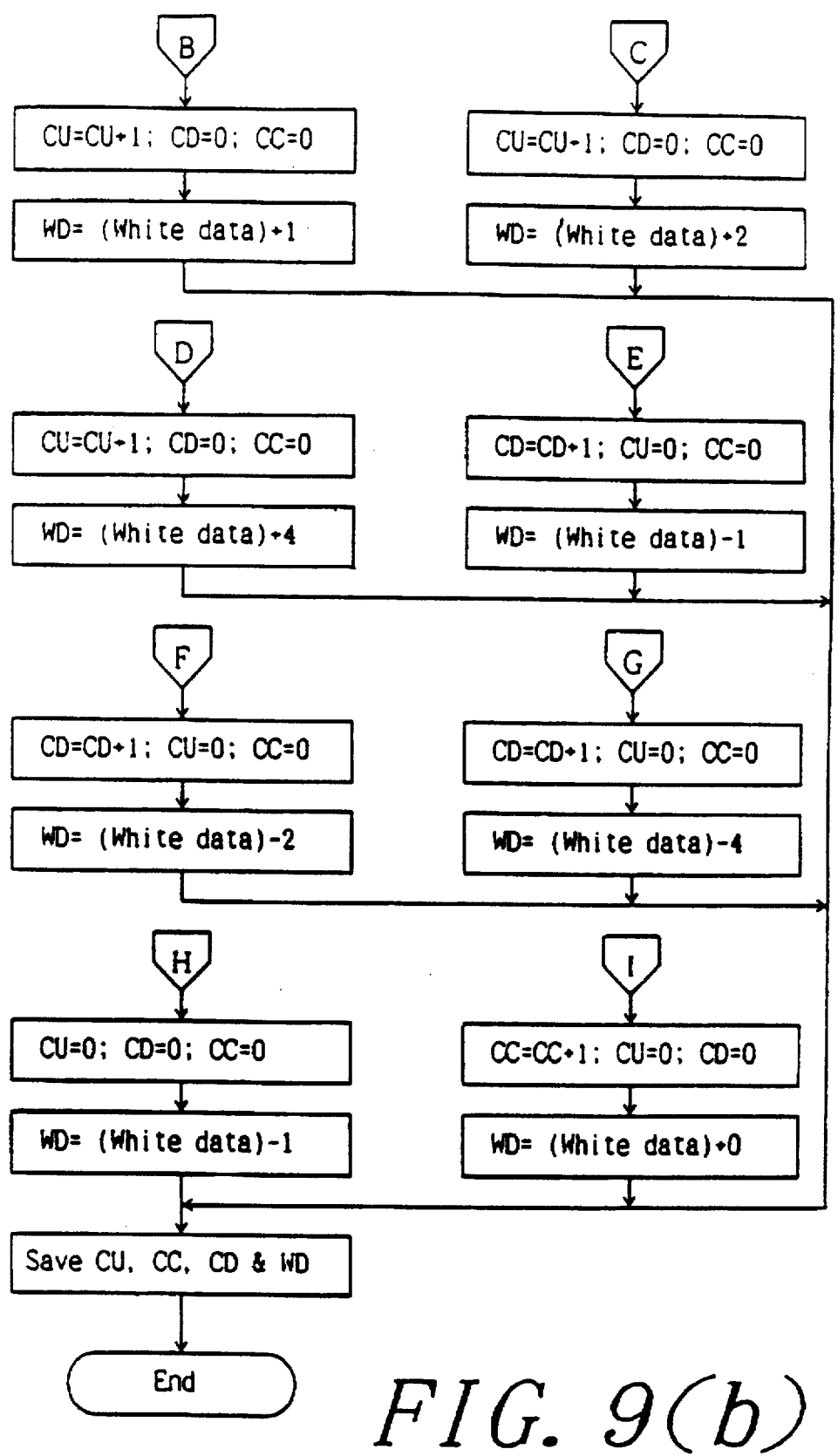

FIGS. 9 (a) and 9 (b) show a flowchart illustrating a variation of the second embodiment, and show transitions of the white-level reference data and the count data.

(1) As a line is scanned, an analog video signal 1a is output and converted into a digital video signal 1d by the analog-to-digital converter 24, and white-level reference data (abbreviated to white data or WD in the Figure) and count data are read from the RAM 26 for the pixel concerned. The count data has three areas CU, CD and CC to be used in increasing, decreasing and leaving unchanged the white-level reference data, respectively.

(2) When the digital video signal 1d (shown as VDout in the Figure) is "FF" and CU is 0 or 1, operation (B) is performed. That is, 1 is added to CU; CD and CC are cleared; and 1 is added to the read white data. The updated CU, CD, CC and white data are stored into the RAM 26.

(3) When VDout is "FF" and CU is 2, operation (C) is performed. That is, 1 is added to CU; CD and CC are cleared; and 2 is added to the read white data. The updated CU, CD, CC and white data are stored into the RAM 26.

(4) When VDout is "FF" and CU is not 2, i.e., larger than 3, operation (D) is performed. That is, 1 is added to CU; CD and CC are cleared; and 4 is added to the read white data. The updated CU, CD, CC and white data are stored into the RAM 26.

(5) When VDout is neither "FF" nor smaller than "F7" (i.e., any value of "F7-FE" and CD is 0 or 1, operation (E) is performed. That is, 1 is added to CD; CU and CC are cleared; and 1 is subtracted from the read white data. The updated CU, CD, CC and white data are stored into the RAM 26.

(6) When VDout is neither "FF" nor smaller than "F7" and CD is 2, operation (F) is performed. That is, 1 is added to CD; CU and CC are cleared; and 2 is subtracted from the read white data. The updated CU, CD, CC and white data are stored into the RAM 26.

(7) When VDout is neither "FF" nor smaller than "F7" and CD is not 2, i.e., larger than 3, operation (G) is performed. That is, 1 is added to CD; CU and CC are cleared; and 4 is subtracted from the read white data. The updated CU, CD, CC and white data are stored into the RAM 26.

(8) When VDout is smaller than "F7" (i.e., "-F6") and CC is smaller than "F", operation (H) is performed. That is, CC, CU and CD are cleared; and 1 is subtracted from the read white data. The updated CU, CD, CC and white data are stored into the RAM 26.

(9) When VDout is smaller than "F7" (i.e., "-F6") and CC is not smaller than "F", operation (I) is performed. That is, 1 is added to CC; CU and CD are cleared; and the read white data is left unchanged. The updated CU, CD, CC and white data are stored into the RAM 26.

The digital video signal 1d, into which the analog video signal 1a is converted by the analog-to-digital converter 24, is sent to an image processing unit and is subjected to various image processing including emphasis processing which emphasizes a contrast between white and black and dither processing which represents a halftone-dot image, such as a photograph, in binary data.

Since the digital circuit portions of the first and second embodiments (FIGS. 2-3 (b)) can be composed only of usual logical circuits such as AND and OR gates, the circuit can easily be fabricated in a large-scale integrated circuit (LSI). Moreover, as for the third embodiment (FIG. 4), since the portion including the driver circuits 390-394 and the adder 3A, used in the second embodiment (FIG. 3 (b)), is substituted for the ROM 49, the number of electronic parts can be reduced and, therefore, low-cost and reliable circuit can be realized.

Although the above embodiments describe examples in which the white-level correction is made on a pixelwise basis, the present invention can easily be applied to a correction on a linewise basis.

As described above, since the white-level correction circuit of the present invention constructed using only digital circuits, the number of electronic parts and print wirings may be reduced, therefore reducing the cost of the circuit. The invention can also provide a stable circuit which is free from oscillation in high frequency regions, unlike conventional ones using analog comparators, and attain a high-speed image processing.

What is claimed is:

1. In an analog-to-digital converter which converts an analog image signal, input thereto and corresponding to a pixel, to output digital image data based on a white-level reference voltage input thereto, a white-level correction circuit comprising:

first storage means for storing therein white-level reference data for the pixel and for reading the stored white-level reference data and producing the stored and read white-level reference data as an output therefrom when the analog image signal is input to the analog-to-digital converter;

digital-to-analog conversion means for converting the white-level reference data, output by the first storage means, to an analog signal supplied thereby to the analog-to-digital converter as the white-level reference voltage input thereto;

decoding means for decoding the digital image data output by the analog-to-digital converter; and correction means operatively connected to said decoding means for generating white-level correction data by correcting the read white-level reference data, based on the decoding by said decoding means, and for storing the white-level correction data into said first storage means.

2. A white-level correction circuit according to claim 1, wherein said correction means generates the white-level correction data by, selectively, adding and subtracting a predesignated value to and from the white-level reference data, based on the decoding by said decoding means.

3. A white-level correction circuit according to claim 1, wherein;

said decoding means further comprises means for decoding the digital image data into first, second and third ranges, the first range being a value larger than a predetermined value, the second range being a value smaller than a predetermined value and the third range being a value between the first and the second ranges; and said correction means further comprises means for generating the white-level correction data by adding a first predetermined value to the white-level reference data for the first range, leaving the white-level reference data unchanged for the second range and subtracting a second predetermined value from the white-level reference data for the third range.

4. A white-level correction circuit according to claim 3, wherein;

the analog-to-digital converter converts the analog image signal to 8-bit digital image data; and the first, second and third ranges are hexadecimal FF, FE to F7, and F6 or less, respectively, and the first and second predetermined values are ones.

5. A white-level correction circuit according to claim 1, wherein said correction means further comprises second storage means for storing the white-level correction data in a storage location thereof addressed by a combination of the read white-level reference data with the decoding by said decoding means and said correction means generates the white-level correction data by reading said second storage means.

6. A white-level correction circuit according to claim 5, wherein:

said decoding means decodes the digital image data into first, second and third ranges, the first range being a value larger than a predetermined value, the second range being a value smaller than a predetermined value and the third range being a value between the first and the second ranges;

said second storage means further comprises means for storing first, second and third data in storage locations thereof, corresponding to the first, second and third ranges, respectively, within an area addressed by the read white-level reference data, the first, second and third data being a first predetermined value added to, the same as, and a second predetermined value subtracted from the read white-level reference data, respectively; and said correction means further comprises means for generating the white-level correction data by reading said second storage means.

7. A white-level correction circuit according to claim 6, wherein;

the analog-to-digital converter converts the analog image signal to 8-bit digital image data; and the first, second and third ranges are hexadecimal FF, FE to F7, and F6 or less, and the first and second predetermined values are ones.

8. A method of correcting white-level reference data used for an analog-to-digital converter, which converts an analog image signal, input thereto and corresponding to a pixel, to output digital image data based on a white-level reference voltage input thereto, said method comprising the steps of:

(a) storing white-level reference data for the pixel in a first storage means;

(b) reading the white-level reference data from the first storage means when the analog image signal is input to the analog-to-digital converter;

(c) converting the white-level reference data, read from the first storage means, to an analog signal and which analog signal is supplied to the analog-to-digital converter as the white-level reference voltage which is input thereto;

(d) decoding the digital image data output by the analog-to-digital converter;

(e) generating white-level correction data by correcting the read white-level reference data, based on said decoding in step (d); and (f) storing the generated white-level correction data in the first storage means.

9. A method of correcting white-level reference data according to claim 8, further comprising:

(g) storing the white-level correction data in a storage location of a second storage means, the storage location addressed by a combination of the read white-level reference data with said decoding in step (d); and in step (e), generating the white-level correction data by reading the first and second storage means.

10. In an analog-to-digital converter which converts an analog image signal, input thereto and corresponding to a pixel, to output digital image data based on a white-level reference voltage input thereto, a white-level correction circuit comprising:

a first memory storing therein white-level reference data for the pixel and from which the stored white-level reference data is read and the stored and read white-level reference data is produced as an output thereof;

an acess controller unit, in synchronism with input of the analog image signal to the analog-to-digital converter, accessing the first memory and reading therefrom and producing as the output thereof the stored and read, white level reference data;

a digital-to-analog converter converting the white-level reference data, output by the first memory, to an analog signal which is supplied thereby to the analog-to-digital converter as the white-level reference voltage input thereto;

a decoder decoding the digital image data output by the analog-to-digital converter; and a white level correction circuit, operatively connected to said decoder, generating white-level correction data by correcting the read white-level reference data, based on the decoding by the decoder, and storing the white-level correction data into the first memory.

11. A white-level correction circuit according to claim 10, wherein the access controller unit is synchronized with the reading of each line of pixels of the digital image data.

12. A white-level correction circuit according to claim 10, wherein the access controller unit is synchronized with the reading of each successive pixel of the digital image data.

13. A method of correcting white-level reference data used for an analog-to-digital converter, which converts an analog image signal, input thereto and corresponding to a pixel, to output digital image data based on a white-level reference voltage input thereto, the method comprising the steps of:

(a) storing white-level reference data for the pixel in a first memory;

(b) reading the white-level reference data from the first memory in synchronism with the input of the analog image signal to the analog-to-digital converter;

(c) converting the white-level reference data, read from the first memory, to an analog signal supplied to an analog-to-digital converter unit as the white-level reference voltage which is input thereto;

(d) decoding the digital image data output by the analog-to-digital converter;

(e) generating white-level correction data by correcting the read white-level reference data, based on the decoding in step (d); and (f) storing the generated white-level correction data in the first memory.

14. A white-level correction circuit according to claim 13, wherein the access controller is synchronized with the reading of each line of pixels of the digital image data.

15. A white-level correction circuit according to claim 13, wherein the access control is synchronized with the read of each successive pixel of the digital image data.

\* \* \* \* \*

UNITED STATES PATENT AND TRADEMARK OFFICE
CERTIFICATE OF CORRECTION

PATENT NO. : 5,694,225
DATED : Dec. 2, 1997
INVENTOR(S) : SUZUKI

It is certified that error appears in the above-identified patent and that said Letters Patent is hereby corrected as shown below:

Col. 2, line 53, delete "requires".

Col. 3, line 20, delete "in";
line 66, change "the" to --a--; and change "a" to --the--.

Col. 8, line 19, change ",WE" to --"WE--.

Col. 9, line 15, after "invention" insert --;--.

Col. 10, line 51, after "invention" insert --is--.

Col. 11, line 22 (Claim 3, line 2), change ";" to --:--;
line 38 (Claim 4, line 2), change ";" to --:--.

Col. 12, line 7 (Claim 7, line 2), change ";" to --:--.

Col. 14, line 17 (Claim 15, line 2), change "read" to --reading--.

Signed and Sealed this

Fourteenth Day of April, 1998

Attest:

BRUCE LEHMAN

*Attesting Officer*   *Commissioner of Patents and Trademarks*